March 25, 1952 W. J. HOLT, JR 2,590,319
ELECTRIC TRANSLATING SYSTEM
Filed Feb. 9, 1950
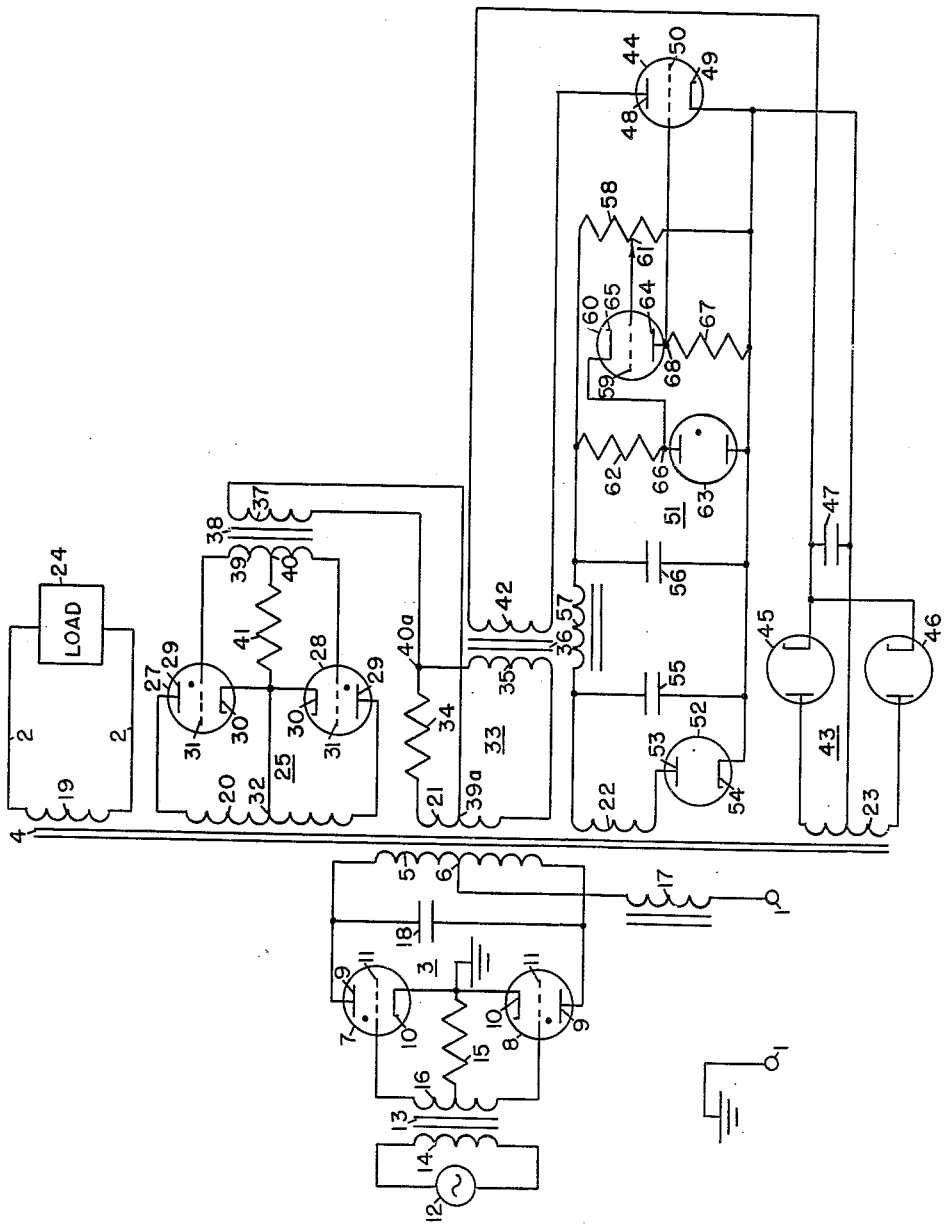
INVENTOR.
WILLIAM J. HOLT, JR.
BY *Walter J. Jagmin*
ATTORNEY Patented Mar. 25, 1952

2,590,319

UNITED STATES PATENT OFFICE 2,590,319

ELECTRIC TRANSLATING SYSTEM

William J. Holt, Jr., Garland, Tex., assignor to Varo Mfg. Co., Inc., Garland, Tex., a corporation of Texas Application February 9, 1950, Serial No. 143,329

9 Claims. (Cl. 321—16)

This invention relates to electric translating systems and more particularly to such systems for transmitting energy from a direct current supply circuit to an alternating current load circuit.

In the operation of electric translating systems for transmitting energy from a direct current supply circuit to an alternating current load circuit, difficulty is encountered in maintaining the voltage of the alternating current load circuit constant where substantial variations occur in the voltage of the direct current supply circuit and in the load conditions of the alternating current load circuit.

Accordingly, it is an object of my invention to provide a new and improved electric translating system for transmitting energy from a direct current supply circuit to an alternating current load circuit.

It is another object of my invention to provide a new and improved electric translating system for transmitting energy from a direct current supply circuit subject to voltage variations to an alternating current load circuit subject to substantial load variations in which the voltage of the alternating current load circuit may be maintained substantially constant.

It is still another object of my invention to provide a new and improved electric translating system for transmitting energy from a direct current supply circuit to an alternating current load circuit having an electric regulating means for maintaining the voltage of the alternating current load circuit substantially constant.

Briefly stated, in the illustrated embodiment of my invention I provide a new and improved electric translating system for supplying alternating current to a constant voltage load circuit from a direct current supply circuit. The electric translating system comprises an inverter having a transformer, a capacitor connected across the primary winding of the transformer, and unidirectionally conducting means, such as electric valves. The electric valves conduct alternately and induce an alternating current in a secondary winding of the transformer across which is connected the alternating current load. The transformer is also provided with a second secondary winding and a variable impedance load connected across the second secondary winding. The variable impedance load comprises a pair of electric valves connected across opposite halves of the second secondary winding. Phase shifting means are associated with the latter electric valves to vary their average conductivity in accordance with the voltage across the load of the first secondary winding to control the variable impedance load and maintain a constant voltage across the alternating current load. By means of the variable impedance load, the total impedance reflected into the first mention electric valves is at all times of the value necessary to maintain the voltage across the alternating current load substantially constant.

For a better understanding of my invention, reference may be had to the following description taken in connection with the accompanying drawing, and its scope will be pointed out in the appended claims. The single figure of the accompanying drawing illustrates diagrammatically a preferred embodiment of my invention for translating direct current into alternating current.

Referring now to the single figure of the accompanying drawing, I provide an electric translating system for transmitting energy from the direct current supply circuit to the alternating current load circuit 2. The electric translating system comprises an inverter 3 of the parallel type having a transformer 4 provided with a primary winding 5. Primary winding 5 has its electrical midpoint 6 connected to the positive side of direct current supply circuit 1 and its end terminals to the other side of circuit 1 through electric valves 7 and 8. Electric valves 7 and 8 are each provided with an anode 9, a cathode 10 and a control grid 11 and may be of any of the several types well known in the art, although I prefer to employ electric valves of the gaseous discharge type. In order periodically to render electric valves 7 and 8 alternately conductive and nonconductive, their control grids 11 are connected to a suitable source of alternating current 12 of the desired frequency through a transformer 13. The primary winding 14 of transformer 13 is connected across source 12 while the control grids 11 are connected to their common cathode circuit through current limiting resistance 15 and opposite halves of secondary winding 16. A reactor 17 is connected between the electrical midpoint 6 of winding 5 and direct current supply circuit 1 and a commutating capacitance 18 is connected across primary winding 5.

The general principles of operation of the above described inverter will be well understood by those skilled in the art. In brief, if one of the electric valves, for example the valve 7, is rendered conductive by the potential impressed on its control grid 11 by source 12 through transformer 13, current will flow through the upper portion of winding 5 and electric valve 7 inducing one half cycle of alternating current in the secondary windings 19, 20, 21, 22 and 23 of transformer 4. During this interval the commutating capacitance 18 becomes charged to substantially twice the potential of the direct current source 1 and when the grid winding 16 reverses polarity to render electric valve 8 conductive, the potential of capacitance 18 is effective to commutate the current from the valve 7 to the valve 8. Current now flows through the lower portion of winding 5 inducing a half cycle of alternating current of opposite polarity in secondary windings 19 to 23. In this manner the current is successively commutated between the valves 7 and 8 and an alternating current is induced in the secondary windings 19 to 23 of transformer 4.

In order to regulate the voltage of alternating current load circuit 2, I provide a voltage control circuit 25 comprising winding 20 and electric valves 27 and 28 which may be of any of the several types well known in the art although I prefer to employ electric valves of the gaseous type. Anodes 29 of electric valves 27 and 28 are connected to opposite ends of winding 20 while their cathodes 30 are connected to the electrical midpoint 32. Alternate half cycles of the alternating current induced in secondary winding 20 are transmitted through each of the two valves 27 and 28, one electric valve 27 or 28 being nonconductive while the other is conductive. By varying the period of time during each half cycle that electric valves 27 and 28 transmit current, the impedance of circuit 25 and therefore the voltage across primary winding 5 and secondary windings 19 to 23 can be varied. For example, if the periods of transmission of electric valves 27 and 28 are increased, the impedance of circuit 25 is decreased which causes the impedance of winding 5 to decrease, decreasing the voltage across primary winding 5 and therefore decreasing the voltage across each of the secondary windings 19 to 23.

The periods of current transmission of electric valves 27 and 28 and the amount of current transmitted, can be controlled by varying the phase relation between the potentials applied to control grids 31 and the voltage applied to anodes 29 of electric valves 27 and 28. For example, the amount of current flowing through electric valve 27 and the upper portion of winding 20 during the half cycle during which a positive potential is impressed on anode 29 of electric valve 27 can be controlled by controlling the time at which the potential impressed on control grid 31 of electric valve 27 reaches a value in excess of the critical value necessary to render electric valve 27 conductive. If the potential impressed on control grid 31 exceeds the critical value at the beginning of the half cycle, the electric valve 27 will conduct current during the full half cycle. If the application of a potential exceeding the critical value is delayed, electric valve 27 will conduct current only during the portion of the half cycle succeeding the application of the potential exceeding the critical value. In order to shift the phase of the potentials impressed on control grids 31 of electric valves 27 and 28 with respect to the potentials impressed on anodes 29 in accordance with the variations in the voltage of alternating current load circuit 2, I provide a phase shifting circuit 33 comprising a resistance 34 connected in series with the reactive winding 35 of a saturable reactor 36 across secondary winding 21. If desired,
a capacitance may be employed instead of resistance 34. The primary winding 37 of a grid drive transformer 38 is connected across an intermediate connection 39a of the winding 21 and the common junction or connection 40a of resistance 34 and reactive winding 35. The secondary winding 39 has its opposite ends connected to control grids 31 of electric valves 27 and 28 and has its electrical midpoint 40 connected to their cathodes 30 through a current limiting resistance 41.

The phase position of the alternating current appearing in winding 37 is changed by varying the amount of direct current flowing in saturating winding 42 of saturable reactor 36. Saturating winding 42 is connected to any suitable source of direct current such as the full wave rectifier 43 through an electric discharge means 44. The conventional rectifier 43 comprises electric discharge means 45 and 46 and secondary winding 23. A condenser 47 may be connected across the output of rectifier 43 to smooth out the direct current output of rectifier 43. Electric discharge means 44 comprises an anode 48, a cathode 49 and a control grid 50 and is preferably of the high vacuum type. By varying the potential impressed on control grid 50, the amount of current flowing in saturating winding 42 and the phase position of the potentials impressed on control grids 31 of electric valves 27 and 28 can be controlled.

In order to vary the phase position of the potentials impressed on control grids 31 in accordance with the voltage of the alternating current load circuit 2, I provide a voltage sensing circuit 51 for impressing a potential on control grid 50 which varies with the voltage of circuit 2. Voltage sensing circuit 51 comprises secondary winding 22 and an electric discharge means 52. Electric discharge means 52 comprises an anode 53 and a cathode 54 and is preferably of the high vacuum type. For more precise control, a separate transformer could be substituted for winding 22. The output of electric discharge means 52 is smoothed out by a filter network comprising condensers 55 and 56 and a smoothing reactor 57. A voltage sensitive divider bridge comprising a resistance 58 is connected across winding 22 and electric discharge means 52. The control grid 59 of an electric discharge means 60 is connected to resistance 58 by an adjustable contact 61. A second voltage divider bridge comprising a resistance 62 in series with a glow discharge means 63, which acts as a voltage regulator, is connected in series across secondary winding 22 and electric discharge means 52. Electric discharge means 60 also comprises an anode 64 and a cathode 65 and is preferably of the high vacuum type. Cathode 65 is connected to the common junction or connection 66 of resistance 62 and glow discharge means 63 in order to maintain cathode 65 at a constant potential regardless of the variations in voltage across winding 22 and electric discharge means 52. Anode 64 is connected to cathodes 54 and 49 of electric discharge means 52 and 50, respectively through a resistance 67. Control grid 50 of electric discharge means 44 is connected to the common junction or connection 68 of anode 64 and resistance 67. Electric discharge means 44 therefore acts as an amplifier of the voltage variations across secondary winding 22.

Assuming now that the electric translating system is in operation, the inverter 3 induces an alternating current in secondary windings 19 to 23 and that the direct current in saturating winding 42 is of such value as to maintain the proper phase relationship between the potential impressed on control grids 31 and the potential impressed on the anodes 29 of electric valves 27 and 28, the impedance of voltage control circuit 25 is of a value to maintain the alternating voltage of alternating current load circuit at a predetermined value. If the voltage across winding 19 and load circuit 2 rises above the predetermined value, the voltage induced in winding 22 will also increase since both windings 19 and 22 are on the same transformer 4. Since the voltage across winding 22 is increased, the voltage across voltage divider bridge 58 will also increase and a more negative potential will be impressed on control grid 59 of electric discharge means 60. The potential impressed on cathode 65, however, will remain substantially constant due to the voltage regulating action of glow discharge means 63. When the potential impressed on control grid 59 is increased negatively, the resistance of electric discharge means 60 is increased and a less negative potential is impressed on control grid 50 of electric discharge means 44. More current will therefore be transmitted by electric discharge means 44 from rectifier 43 to saturating winding 42 of saturable reactor 36. As a result, the inductance of reactive winding 35 will be decreased and the phase of the alternating voltage appearing across winding 37 will be retarded or advanced with respect to the phase of alternating voltage across winding 20. The potentials impressed on control grids 31 will therefore render electric valves 27 and 28 conductive at earlier times during the alternate half cycles during which valves 27 and 28 can be respectively rendered conductive and the impedance of voltage control circuit 25 is decreased. Since the impedance of voltage control circuit 25 is decreased, the total impedance reflected into inverter 3 is decreased decreasing the voltage across primary winding 5 and therefore decreasing the voltage across alternating load circuit 2 to the predetermined value. If the voltage across load circuit 2 decreases, voltage sensing circuit 51 causes less current to be transmitted by electric discharge means 44 to saturating winding 42 and phase shifting circuit 33 causes the potentials impressed on grids 31 to render valves 27 and 28 conductive at later times during the half cycles during which electric valves 27 and 28 can be respectively rendered conductive. The impedance of the voltage control circuit is therefore increased, raising the voltage across alternating current load circuit 2. In this manner the voltage across load may be maintained constant. In order that regulation of the voltage across load 24 extend from no load to a stated overload, the components of voltage control circuit 25 are so chosen that when electric valves 27 and 28 are rendered conductive at the very beginning of the alternate half cycles of the alternating current impressed on anodes 29 and transmit a maximum amount of current, the impedance of circuit 25 is equal to the impedance of the normal full load across load circuit 2. This condition will occur when the load 24 across load circuit 2 is of zero value.

If desired electric valves 27 and 28 may be replaced by electric discharge means of the high vacuum type. In this case rectifier 43 and phase shifting circuit 33 are eliminated, the potential across resistance 67 being applied directly to the control grids of the electric discharge means of the high vacuum type. The voltage drop across electric discharge means of the high vacuum type being several times the voltage drop across electric valves of the gaseous type, the illustrated embodiment of my invention is preferred since it allows control of a greater range of voltage variation across load 3.

Electric valves 27 and 28 may also be connected across winding 19 dispensing with winding 20 but in this case the voltage of secondary winding 19 must be of a value appropriate to the operation of electric valves 27 and 28. In order that values of the voltage across load 24 and the voltage across electric valves 27 and 28 be independent of each other, a separate winding 20 is provided for electric valves 27 and 28 and provides a voltage having an optimum value for the operation of electric valves 27 and 28.

If more precise control of the voltage of load circuit 2 is desired, a separate transformer having its primary winding connected across winding 19 and having its secondary winding energizing the same circuit as secondary winding 22 can be substituted for winding 22.

While I have shown and described my invention as applied to a particular system of connections and as embodying various devices diagrammatically shown, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination: a direct current supply circuit; an alternating current load circuit; electric translating apparatus connected between said circuits and comprising a transformer having a primary winding and a first secondary winding, a plurality of electric valves connected between said primary winding and said direct current supply circuit, and a capacitor connected across one of said windings; a variable impedance means comprising a second secondary winding on said transformer; and control means operatively associated with said variable impedance means and said load circuit for varying said impedance means in accordance with the voltage of said load circuit.

2. The device of claim 1 in which said variable impedance means comprises a pair of electric valves connected across opposite halves of said second secondary winding.

3. The device of claim 2 in which each of said electric valves comprises an anode, a cathode and a control grid; said control means comprising means for shifting the phase of the potentials impressed on said control grids with respect to the potentials impressed on said anodes in accordance with the voltage of said load circuit.

4. In combination: a direct current supply circuit; an alternating current load circuit; electric translating apparatus connected between said circuits and comprising a transformer having a primary winding and a first secondary winding, a plurality of electric valves connected between said primary winding and said direct current supply circuit, and a capacitor connected across one of said windings; a variable impedance means comprising a second secondary winding on said transformer, and a pair of electric valves, each of said electric valves comprising an anode, a cathode and a control grid, said anodes being connected to opposite ends of second secondary winding and said cathodes being connected to the electrical midpoint of said second secondary winding; voltage sensing means operatively associated with said load circuit for producing a potential which varies in accordance with the voltage of said load circuit; and phase shifting means responsive to said potential for varying the phase of the potentials impressed on said control grids in accordance with the voltage of said load circuit.

5. In combination: a direct current supply circuit; an alternating current load circuit; electric translating apparatus connected between said circuits and comprising a transformer having a primary winding and a first secondary winding, a plurality of electric valves connected between said primary winding and said direct current supply circuit, and a capacitor connected across one of said windings; a variable impedance means comprising a second secondary winding on said transformer, and a pair of electric valves, each of said electric valves comprising an anode, a cathode and a control grid, said anodes being connected to opposite ends of said second secondary winding and said cathodes being connected to the electrical midpoint of said second secondary winding; voltage sensing means operatively associated with said load circuit for producing a potential which varies in accordance with the voltage of said load circuit; means for amplifying said potential; and phase shifting means responsive to the amplified potential for varying the phase of the potentials impressed on said control grids.

6. In combination: a direct current supply circuit; an alternating current load circuit; electric translating apparatus connected between said circuits and comprising a transformer having a primary winding and a first secondary winding, a plurality of electric valves connected between said primary winding and said direct current supply circuit, and a capacitor connected across one of said windings; a variable impedance means comprising a second secondary winding on said transformer, and a pair of electric valves, each of said electric valves comprising an anode, a cathode and a control grid, said anodes being connected to opposite ends of said secondary winding and said cathodes being connected to the electrical midpoint of said second secondary winding; and means operatively associated with said load circuit and said control grids for varying the amount of current transmitted by said pair of electric valves in accordance with the variation in the voltage of said alternating current load circuit.

7. In combination: a direct current supply circuit; an alternating current load circuit; electric translating apparatus connected between said circuits and comprising a transformer having a primary winding and a first secondary winding, a plurality of electric valves connected between said primary winding and said direct current supply circuit, and a capacitor connected across one of said windings; a variable impedance means comprising a second secondary winding on said transformer, and a pair of electric valves, each of said electric valves comprising an anode, a cathode and a control grid, said anodes being connected to opposite ends of said secondary winding and said cathodes being connected to the electrical midpoint of said second secondary winding; means for sensing the voltage of said alternating current load circuit; and means operatively associated with said last mentioned means and said control grids for varying the impedance of said variable impedance means in accordance with the voltage of said alternating current load circuit.

8. In combination: a direct current supply circuit; an alternating current load circuit; electric translating apparatus connected between said circuits and comprising a transformer having a primary winding and a first secondary winding, a plurality of electric valves connected between said primary winding and said direct current supply circuit, and a capacitor connected across said primary winding; and means for varying the impedance of said transformer in accordance with the voltage of said alternating current load circuit.

9. In combination: a direct current supply circuit; an alternating current load circuit; electric translating apparatus connected between said circuits and comprising a transformer having a primary winding and a first secondary winding, a plurality of electric valves connected between said primary winding and said direct current supply circuit, and a capacitor connected across said primary winding; means for varying the impedance of said transformer, said means comprising a second secondary winding and electric valve means for varying the current in said second secondary winding; and control means operatively associated with said alternating current load circuit and said electric valve means for varying the current in said second secondary winding in accordance with the voltage of said alternating current load circuit.

WILLIAM J. HOLT, Jr.

REFERENCES CITED

The following references are of record in the file of this patent:

UNITED STATES PATENTS

| Number | Name | Date |
| --- | --- | --- |
| 2,373,997 | Boykin | Apr. 17, 1945 |